United States Patent
Wang et al.

(10) Patent No.: US 11,016,262 B2
(45) Date of Patent: May 25, 2021

(54) LENS DRIVE DEVICE

(71) Applicant: Shanghai Billu Electronics Co., Ltd., Shanghai (CN)

(72) Inventors: Jianhua Wang, Shanghai (CN); Gaofeng Gong, Shanghai (CN)

(73) Assignee: Shanghai Billu Electronics Co., Ltd., Shanghai (CN)

( * ) Notice: Subject to any disclaimer, the term of this patent is extended or adjusted under 35 U.S.C. 154(b) by 30 days.

(21) Appl. No.: 16/092,219

(22) PCT Filed: Sep. 12, 2017

(86) PCT No.: PCT/CN2017/101339
§ 371 (c)(1),
(2) Date: Oct. 9, 2018

(87) PCT Pub. No.: WO2018/086407
PCT Pub. Date: May 17, 2018

(65) Prior Publication Data
US 2020/0341230 A1  Oct. 29, 2020

(30) Foreign Application Priority Data
Nov. 11, 2016  (CN) .......................... 201610993116.9

(51) Int. Cl.
*G02B 7/02* (2021.01)
*G02B 7/08* (2021.01)
(Continued)

(52) U.S. Cl.
CPC .............. *G02B 7/026* (2013.01); *G02B 7/08* (2013.01); *H02K 41/035* (2013.01); *H04N 5/2254* (2013.01)

(58) Field of Classification Search
CPC ... G02B 7/00; G02B 7/02; G02B 7/04; G02B 7/08; G02B 7/09; G02B 7/026;
(Continued)

(56) References Cited

U.S. PATENT DOCUMENTS

2011/0205648 A1*  8/2011  Takei ....................... G02B 7/08
359/824
2015/0155768 A1  6/2015  Hsu et al.
(Continued)

FOREIGN PATENT DOCUMENTS

CN       202817956 U    3/2013
CN       103760656 A    4/2014
(Continued)

OTHER PUBLICATIONS

Supplemental EP Search Report dated Sep. 20, 2019 re: Application No. 17870348.4, pp. 1-12.
(Continued)

*Primary Examiner* — Jie Lei
(74) *Attorney, Agent, or Firm* — Gang Yu

(57) ABSTRACT

A lens drive device, including a screening can (01); periphery of the inside an upper cover (05) and driving magnets (08); a lens support (06) is further provided inside the screening can (01); a driving coil (07) is winded at a outer periphery of the lens support (06); the driving magnets (08) include a first driving magnet and a second driving magnet; a structure of each of the first driving magnet and the second driving magnet includes corner segment (082) distributed along a corner of the screening can (01) and edge segment (081) distributed along an edge of the screening can (01); and the first driving magnet and the second driving magnet are in a central symmetry around an axial center of the lens drive device. By improving a structure of the lens drive
(Continued)

device, the lens drive device has beneficial effects of low power consumption and large driving force.

9 Claims, 5 Drawing Sheets

(51) Int. Cl.
 *H02K 41/035* (2006.01)
 *H04N 5/225* (2006.01)

(58) Field of Classification Search
 CPC .......... G02B 7/10; G02B 7/102; G02B 27/64; G02B 27/646; G02B 27/642; G02B 27/644; H04N 5/225; H04N 5/2254; H04N 5/52257; H04N 5/232; H04N 5/23248; H04N 5/23287; H04N 5/2328; H02K 41/035; H02K 41/0356; H02K 1/00
 USPC ....... 359/819, 557, 554, 677, 683, 813, 814, 359/823, 824
 See application file for complete search history.

(56) References Cited

U.S. PATENT DOCUMENTS

| 2016/0109680 | A1  | 4/2016 | Park et al. |
| 2017/0115463 | A1* | 4/2017 | Osaka ................... G02B 7/023 |
| 2018/0011284 | A1  | 1/2018 | Park et al. |

FOREIGN PATENT DOCUMENTS

| CN | 103792640 A  | 5/2014  |
| CN | 103280941 B  | 3/2016  |
| CN | 106646810 A  | 5/2017  |
| CN | 206515536 U  | 9/2017  |
| EP | 2937726 A1   | 10/2015 |
| EP | 3165956 A1   | 5/2017  |
| JP | 2009251031 A | 10/2009 |
| WO | 2016002528 A1 | 1/2016 |
| WO | 2016099051 A1 | 6/2016 |

OTHER PUBLICATIONS

International Search Report for PCT application No. PCT/CN2017/101339 filed on Sep. 12, 2017, dated Dec. 22, 2017.

* cited by examiner

LENS DRIVE DEVICE

TECHNICAL FIELD

The present disclosure relates to a drive device, and more particularly, to a lens drive device.

BACKGROUND

In an existing lens drive device, in order to minimize the device, it is common to arrange driving magnets on corners of the lens drive device. For example, CN103869443A discloses a lens drive device, including magnets, wherein the magnets are provided at certain gap positions vacated by positions corresponding to corners of a quadrangle shape of the lens drive device. CN101738704A discloses a lens drive device, including magnets, wherein the magnets are set into trapezoidal magnets having an arc bottom edge and two unsymmetrical oblique edges, and the trapezoidal magnets are provided at four corners of an inner cavity. CN101206295A discloses a lens drive device having magnets, including the magnets arranged in a magnet yoke ring, geometrical shapes of the magnets are set into a triangular prismatic shape, four magnets are provided, an inner cavity of the magnetic yoke ring is set into a square inner cavity, and the four magnets are respectively provided at four corners of the square inner cavity of the magnetic yoke ring. JP2007-139810 also discloses such lens drive device.

The above technical solutions are reasonable in a miniature lens drive device. However, if the device is further miniaturized, such a manner of arranging the magnets at the corners has been far from to support normal work of the drive device because no sufficient driving force can be provided. In order to implement the purpose of being more miniaturized, when necessary, there is a need to arrange a driving coil winded at the outer periphery of a lens support to be close to the peripheral sidewall of a ring port. In such a way, on a long distance of edges of the peripheral sidewall of the ring port, there is no more space for arranging the driving magnets. Therefore, the length (area) that the driving magnets and the driving coil are opposite is further reduced, and the driving force is more impossibly sufficient.

As a matter of fact, the structure of the lens drive device in the above technical solutions has limitations. Under a condition in which the existing drive device implements the miniaturization, with the reduction of an effective action length (area) of the driving magnets, the defects of small driving force, poor stroke and the like will be caused. Further, the lens support cannot move a lens to an ideal target staying position, and at last the imaging effect is affected.

Therefore, on the basis of a related technology, there are many difficulties to further miniaturize the device. How to implement the purposes of miniaturization, low power consumption and relatively large driving force of the lens drive device is a problem to be urgently solved by a person skilled in the art.

SUMMARY

The present disclosure is provided a lens drive device. By improving a structure of the lens drive device and particularly improving structures and installation positions of driving magnets, and further improving other related components, the finally obtained lens drive device may implement a purpose of further miniaturization, and has beneficial effects of low power consumption and large driving force compared with a related technology.

To this end, the technical solutions of some embodiments of the present disclosure are as follows.

A lens drive device includes a screening can; a periphery of the inside of the screening can is provided with an upper cover and driving magnets; a lens support is further provided inside the screening can; a driving coil is winded at a outer periphery of the lens support; wherein, the driving magnets include a first driving magnet and a second driving magnet; a structure of each of the first driving magnet and the second driving magnet includes corner segment distributed along a corner of the screening can and edge segment distributed along an edge of the screening can; and the first driving magnet and the second driving magnet are in a central symmetry around an axial center of the lens drive device.

Specifically, according to a novel structure of the driving magnets, a driving force of exiting lens drive device can be greatly improved. It is to be noted that, along with the development of driving magnet manufacturing industry, structures of the driving magnets of the present disclosure are quite different from those in the related technology. On one hand, with the development of existing magnet manufacturing industry, such structures and improvements in shape are supported, and are not like the previous solutions in which the driving magnets cannot be designed into an integral edge bending form due to the limitations. On the other hand, with such a design, materials and use weights of the driving magnets are reduced to some extent, and weight of the overall structure of the lens drive device is reduced.

In an exemplary embodiment, the lens drive device further includes a Hall detection component; the Hall detection component includes a Hall gasket and a Hall magnet provided on the lens support, and a Printed Circuit Board (PCB) component; the PCB component includes a PCB board provided at one side of the screening can as well as a Hall chip, a capacitor, pins and an internal connection circuit provided on the PCB board; the one side of the screening can is not the edge of the screening can having the edge segment of the driving magnets; and the Hall chip and the Hall magnet are arranged oppositely and are located on parts far away from the first driving magnet and the second driving magnet.

Specifically, the Hall detection component is a device added along with the improvement of a use requirement of a user. Its main action part, namely a part where the Hall chip and the Hall magnet are arranged oppositely, is located on a part far away from the first driving magnet and the second driving magnet. Owing to the improvements of novel the driving magnets in shape and position, in order not to affect the Hall detection effect, the existing positional relationships need to be further adjusted and are located at positions far away from a tail end of a corner segment of the first driving magnet and a tail end of a edge segment of the second driving magnet, or at positions far away from a tail end of a edge segment of the first driving magnet and a tail end of a corner segment of the second driving magnet, and most preferably, at central positions whose distances to the tail end of the corner segment of the first driving magnet and the tail end of the edge segment of the second driving magnet are equal, or central positions whose distances to the tail end of the edge segment of the first driving magnet and the tail end of the corner segment of the second driving magnet are equal.

In an exemplary embodiment, an upper gasket is further provided inside the screening can; an upper spring is arranged above the lens support and a lower spring is arranged below the lens support; and a pedestal that takes supporting effect is further provided at a bottom of the lower spring.

In an exemplary embodiment, the lens support is formed by cutting four corners of a quadrilateral shape, and includes four straight edges and four corner edges; the driving coil is winded at the outer periphery of the lens support in an octagon-like shape; the first driving magnet is corresponding to adjacent one corner edge and one straight edge of the lens support, and the second driving magnet is corresponding to adjacent another corner edge and another straight edge of the lens support, and the first driving magnet and the second driving magnet are distributed in a central symmetry in a positional relationship of being parallel to the driving coil. That is, the driving magnets and the driving coil are parallel and opposite to each other, and distances in parallel sections are consistent to each other.

In an exemplary embodiment, the first driving magnet and the second driving magnet are the same in shape and size and are distributed oppositely at 180°; a thickness of the corner segment and a thickness of the edge segment of each of the driving magnets are equal.

In an exemplary embodiment, in the lens drive device, a hole is formed on one side, corresponding to the PCB board, of the upper cover; the hole is configured to embed the Hall chip of a lug boss on the PCB board. Further, the Hall chip is opposite to the Hall magnet provided on the lens support. Preferably, the hole is formed at a middle position between the first driving magnet and the second driving magnet, so as to prevent the driving magnets from affecting normal work of the Hall chip.

In an exemplary embodiment, a lens drive device includes a screening can, an upper gasket, an upper cover, an upper spring and two driving magnets located on inner sidewall of the screening can, further includes a lens support for supporting a lens, a driving coil winded at the outer periphery of the lens support, and a Hall gasket and a Hall magnet located on the lens support, and further includes a PCB board, a Hall chip, a capacitor, four pins and an internal connection circuit, wherein the PCB board, the Hall chip, the capacitor, the four pins, the internal connection circuit, the Hall gasket and the Hall magnet form a lens position detection mechanism; the Hall magnet and the Hall chip are spatially spaced to each other and are arranged oppositely; and the lens drive device further includes a lower spring for supporting the lens support together with the upper spring from top of the lens support and bottom of the lens support, and further includes a pedestal, a bearing component and particularly components for supporting the lens support, etc.

According to a mobile target position fed back by the lens position detection mechanism (namely, the Hall detection component), a certain current instruction is charged to the driving coil, so that the lens support starts to be driven to the target position. At a driving stop position, a composite force for applied forces of the upper spring and the lower spring on front and rear directions keeps a balanced state with an electromagnetic force generated by the driving coil and the driving magnets. The peripheral end of the lens support is of an octagonal shape; and inner and outer peripheries of the driving coil are consistent to the outer periphery of the lens support.

Some embodiments of the present disclosure have the following characteristics: by employing a space structure allowed by the existing lens drive device and along inner peripheral sidewall of the screening can, the two driving magnets are respectively and integrally bent, and each of the two driving magnets is extended from one inner side of the screening can to adjoin angle portion. In this way, effective length (area) that the driving magnets and the driving coil are opposite is increased; that is, under the action of a same current, since effective coverage area of a magnetic field is increased, the magnetism generated by interaction between the magnetic field and the driving coil after the driving coil is powered on is improved correspondingly and thus the relatively large driving force can be implemented. The lens drive device of some two driving magnets the present disclosure is a lens drive device that can meet requirements on miniaturization, low power consumption and large driving force.

LABELS IN THE DRAWINGS

Figure 1:
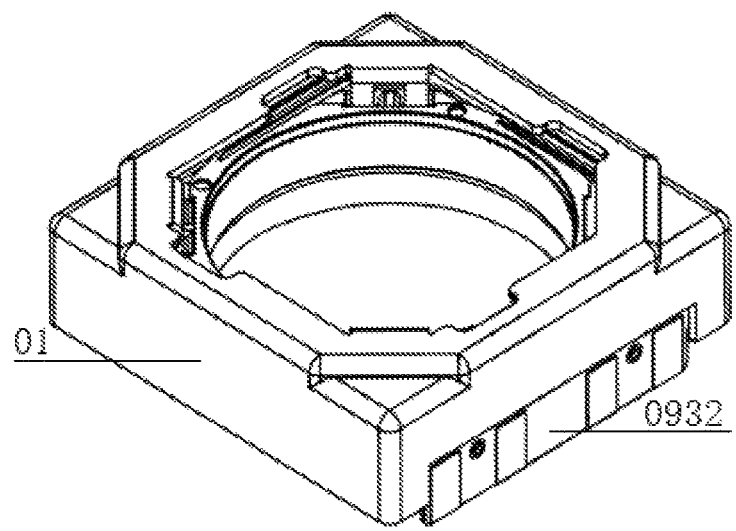
FIG. 1 is a stereoscopic structural schematic diagram of a front surface of a related lens drive device in an embodiment of the present disclosure.

01—a screening can
011—a turnup edge
02—an upper gasket
03—an upper spring
04—a lower spring
041—a lower spring terminal pin
042—an outer peripheral side penetration hole
043—an inner peripheral side penetration hole
05—an upper cover
051—a hole
06—a lens support
061—a gap portion
07—a driving coil
08—a driving magnet
081—an edge segment of the driving magnet
082—a corner segment of the driving magnet
09—a Hall detection component
091—a Hall magnet 092—a Hall gasket
093—a PCB component
0931—a capacitor
0932—a PCB board
0933—a PCB pin
0934—a Hall chip
10—a pedestal
101—a lug boss
102—a dustproof ring

DETAILED DESCRIPTION OF THE EMBODIMENTS

The present disclosure will be further described below with reference to accompanying drawings and specific embodiments, but should not be taken as limitations to the present disclosure.

Some embodiments of the present disclosure provides a lens drive device, which include a screening can 01; a periphery of the inside of the screening can 01 is provided with an upper cover 05 and driving magnets 08; a lens support 06 is further provided inside the screening can 01; a driving coil 07 is winded at a outer periphery of the lens support 06; wherein, the driving magnets 08 include a first driving magnet and a second driving magnet; a structure of each of the first driving magnet and the second driving magnet includes corner segment 082 distributed along a corner of the screening can 01 and edge segment 081 distributed along an edge of the screening can 01; and the first driving magnet and the second driving magnet are in a central symmetry around an axial center of the lens drive device.

Further, the lens drive device further includes a Hall detection component 09; the Hall detection component includes a Hall gasket 092 and a Hall magnet 091 provided on the lens support, and a PCB component 093; the PCB component 093 includes a PCB board 0932 provided at one side of the screening can 01 as well as a Hall chip 0934, a capacitor 0931, pins 0933 and an internal connection circuit provided on the PCB board 0932; the one side of the screening can is not the edge of the screening can having the edge segment 81 of the driving magnets; and the Hall chip 0934 and the Hall magnet 091 are arranged oppositely and are located on parts far away from the first driving magnet and the second driving magnet.

Figure 2:
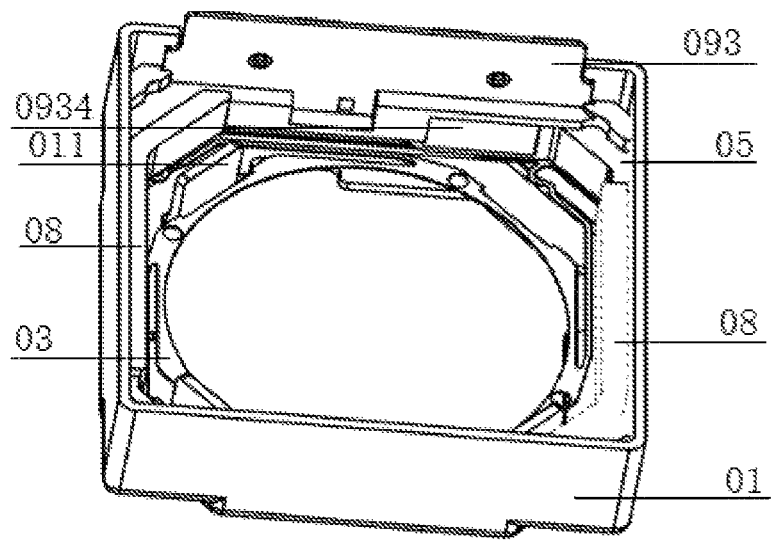
FIG. 2 is a stereoscopic structural schematic diagram of a back surface of a related lens drive device in an embodiment of the present disclosure.

As shown in FIG. 1-2, by employing a space structure allowed by the existing lens drive device and along inner peripheral sidewall of the screening can 01, the two driving magnets 08 are respectively and integrally bent, and each of the two driving magnets is extended from one inner side of the screening can 01 to adjoin angle portion. In this way, the length (area) that the driving magnets 08 and the driving coil 07 are opposite is increased; that is, under the action of a same current, since the effective coverage area of a magnetic field is increased, the magnetism generated by interaction between the magnetic field and the driving coil after the driving coil is powered on is improved correspondingly and thus the relatively large driving force can be implemented.

In an embodiment, the screening can 01 is made of a non-magnetic soft stainless steel material, is of a quadrangle housing shape having four sides seeing from a plane, and during an external connection process, has effects of preventing a static electricity and electromagnetically shielding by grounding. Wherein, two opposite side portions are respectively provided with one driving magnet 08 integrally bent.

In an embodiment, the upper gasket 02 is arranged between the screening can 01 and the upper spring 03, is of a square platy structure and has the same material and hardness with the upper spring 03. After the upper gasket 02 is put into the screening can 01, planeness of the upper spring 03 after the upper spring 03 is assembled is guaranteed.

In an embodiment, the upper spring 03 is of a platy leaf spring structure, and is located between the screening can 01 and the upper cover 05. An outer ring of the upper spring 03 is provided on the upper cover, and an inner ring of the upper spring is fixed with the top end surface of the lens support 06 by nesting and splicing.

Figure 3:
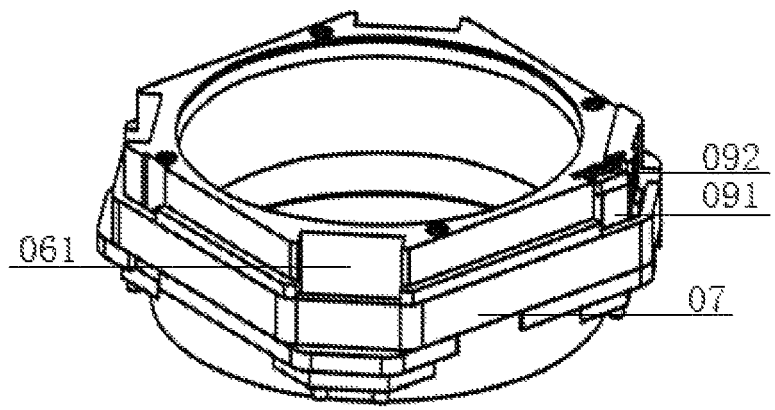
FIG. 3 is a schematic diagram of a positional structure of a lens support and a Hall magnet in an embodiment of the present disclosure.

In a specific embodiment, as shown in FIG. 3, the lens support 06 is of a tubular shape on an optical axis diameter direction, and the upper end surface and the lower end surface are respectively supported and clamped by the upper spring 03 and the lower spring 04. An inner periphery of the lens support is provided with a lens, and an outer periphery of the lens support is provided with the driving coil 07. An outer peripheral of the lens support 06 is of an octagonal shape. An inner periphery and an outer periphery of the driving coil 07 are consistent with a outer periphery of the lens support 06 in shape. Gap portions 061 are respectively provided at upper four corners of the outer periphery of the lens support 06. Each of the gap portions are matched with each of turnup edges 011 inside the screening can 01 in a non-contact manner. When the lens support 06 is driven, good anti-deflection torsion resistance is achieved on X and Y axles of the circumferential direction or on a Z axis direction of an optical axis. An opened notch portion is additionally provided at an upper corner of the lens support 06. The opened notch portion is accommodated into the Hall gasket 092 and the Hall magnet 091 sequentially and vertically from inside to outside. A back gasket provided inside the Hall magnet 091 is made of a stainless steel high-magnetism material and has effect of resisting magnetic flux leakage, so that the magnetic flux intensity of the Hall magnet is effectively protected and improved, and meanwhile, the Hall magnet 091 can be assembled more flatly.

Figure 4:
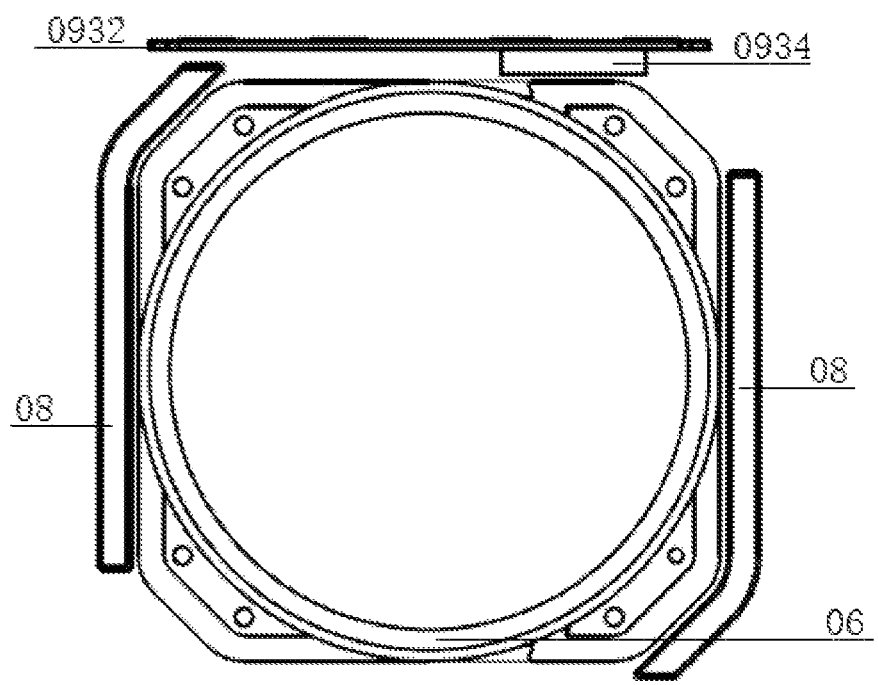
FIG. 4 is a top view of a positional relationship of a Hall detection component and related components in an embodiment of the present disclosure.
Figure 5:
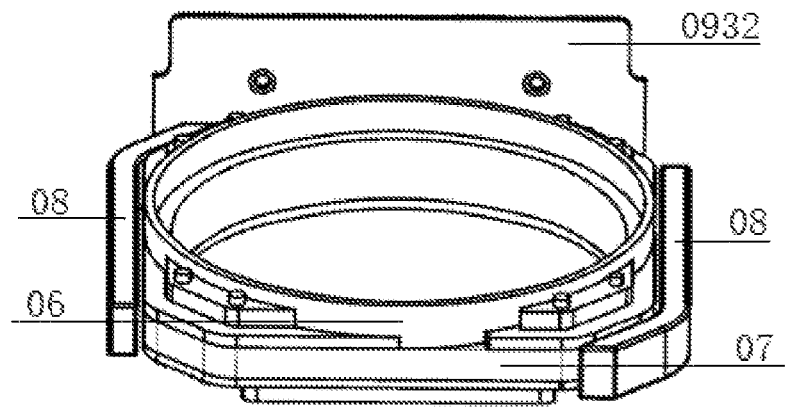
FIG. 5 is a side view of a positional relationship of a Hall detection component and related components in an embodiment of the present disclosure.

In a specific embodiment, as shown in FIG. 4-5, the Hall magnet 091 is arranged in the opened notch portion of the lens support 06. The maximum avoidance distance is formed between a position where integral edge-bending driving magnet 08 is arranged and the Hall magnet 091, so mutual interference of magnetic fields is avoided, and thus the maximum prevention is made in a space interval.

Figure 6:
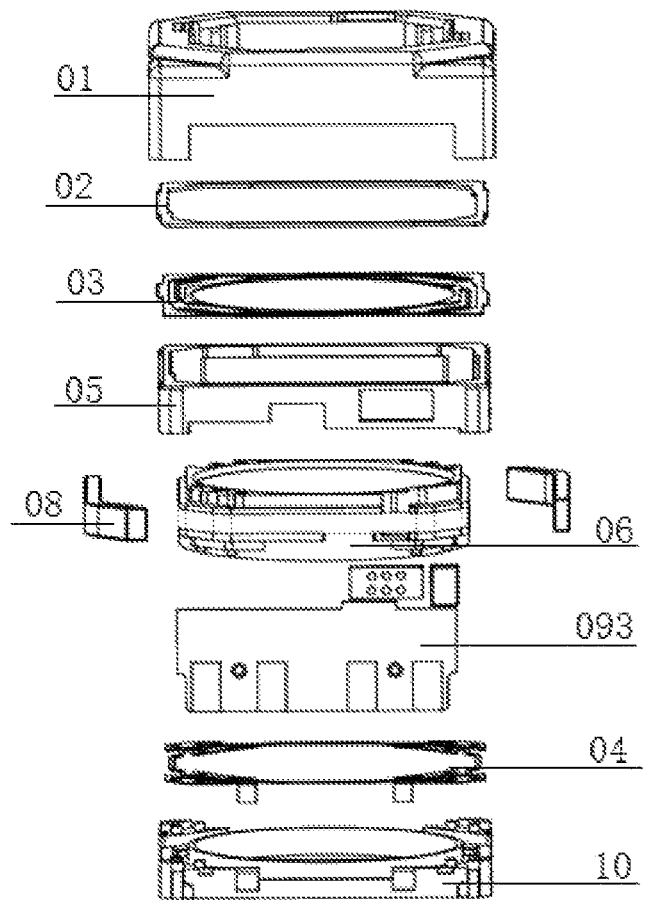
FIG. 6 is a structural decomposition schematic diagram of a lens drive device in an embodiment of the present disclosure.

In a specific embodiment, as shown in FIG. 6, the upper cover 05 is of a frame structure; and the upper cover 05 is provided inside the screening can 01.

Figure 7:
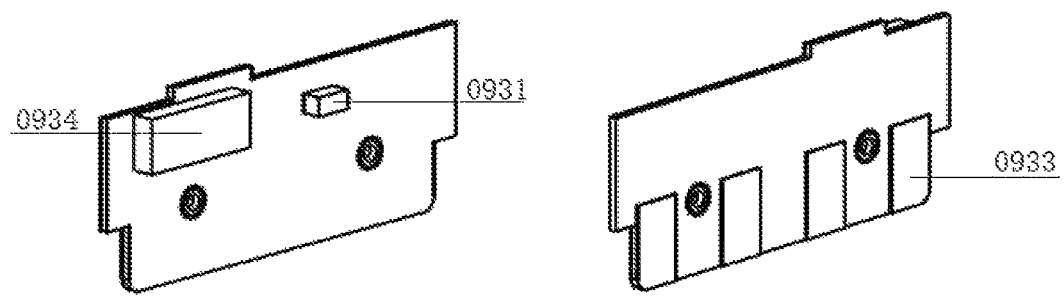
FIG. 7 is a structural schematic diagram of a PCB component in an embodiment of the present disclosure.

In a specific embodiment, as shown in FIG. 7, the PCB component 093 consists of a PCB board 0932, a Hall chip 0934, a capacitor 0931, four pins 0933 and an internal connection circuit.

Figure 8:
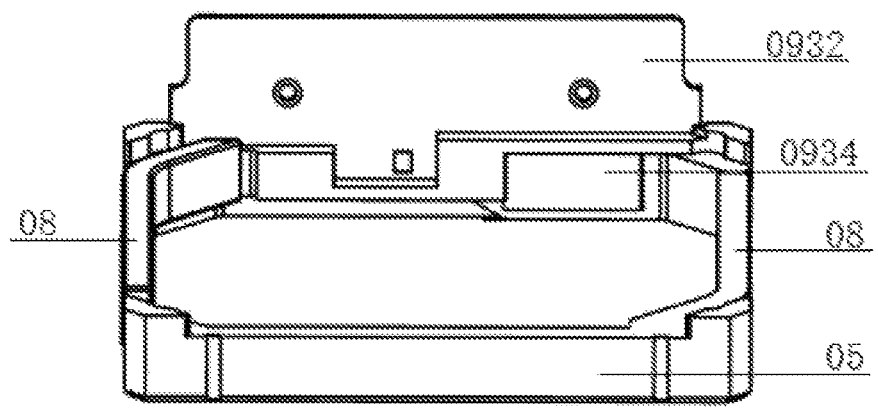
FIG. 8 is a schematic diagram of a positional relationship between a Hall chip after being embedded into a hole of an upper cover and a driving magnet in an embodiment of the present disclosure.

In a specific embodiment, as shown in FIG. 8, a hollow port (a hole) 051 is formed on a position, close to a corner, at the right side of the upper cover 05. After the Hall chip 0931 protruded on the PCB board 0932 is embedded into the hollow port 051 of the upper cover, the Hall chip is firmed fixed in the hollow port; and a position of the Hall chip 0934 is opposite to the Hall magnet 091 provided on the lens support 06 in a space position.

Figure 9:
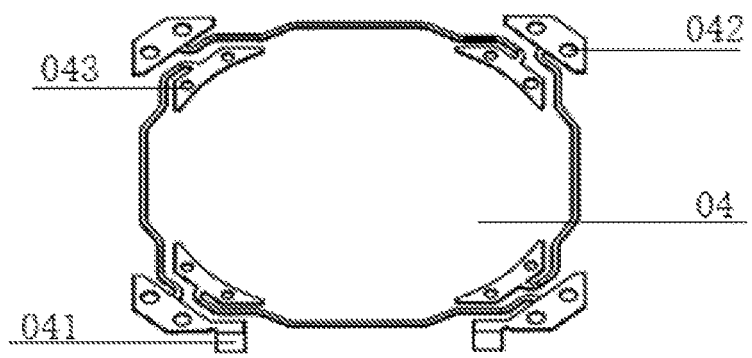
FIG. 9 is a stereoscopic structural schematic diagram of a lower spring in an embodiment of the present disclosure.

In a specific embodiment, as shown in FIG. 9, the lower spring 04 is of a planar leaf spring structure. Multiple outer peripheral side penetration holes 042 and multiple inner peripheral side penetration holes 043 are formed at four corners of the lower spring 04. The outer peripheral side penetration holes 042 are matched with lug bosses 101 on the pedestal 10 so as to the lower spring 04 is fixed on the pedestal 10. Inner peripheral side portion of the lower spring 04 is provided on a bottom surface of the lens support 06; and by pointing an adhesive on the multiple inner peripheral side penetration holes 043, the inner peripheral side portion of the lower spring 04 is firmly fixed on the bottom surface of the lens support 06. Two end portions at same side of the lower spring are provided with two terminal pins 041; and after assembly, the two terminal pins 041 contact two pins 0933 on the PCB board 0932 to form internal electrical connections.

Figure 10:
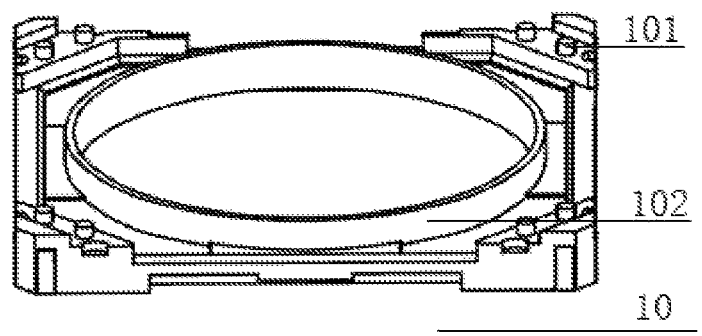
FIG. 10 is a stereoscopic structural schematic diagram of a pedestal in an embodiment of the present disclosure.

In a specific embodiment, as shown in FIG. 10, the pedestal 10 is used as a bearing mobile component; a dustproof ring 102 having a certain height and protruded is arranged along a peripheral sidewall of a inner cavity of the pedestal 10, and is matched with a lower peripheral end of the lens support 06 for dustproof effect. The pedestal 10 is embedded into the screening can 01.

The internal electrical connection is as follows: start line and end line of the driving coil winded at the outer periphery of the lens support 06 are respectively welded to two different portions on a surface of the lower spring. Two terminal pins of the lower spring are respectively and electrically connected with the two pins 0933 of the PCB board.

Through a Hall effect of the Hall chip in the PCB board and interaction of the Hall magnet, there forms a control means for detecting a feedback of a lens position, and thus a closed-loop camera drive is formed. Therefore, the lens in the lens support is shifted more accurately at each time, the times that the lens is moved back and forth is reduced, and the effect of focusing quickly and accurately is achieved.

Figure 11:
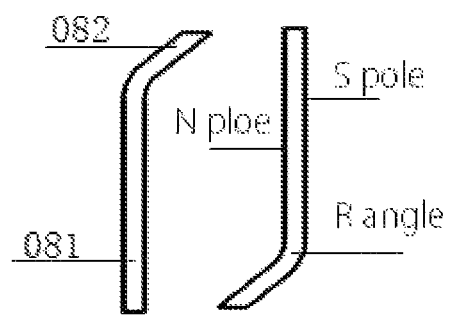
FIG. 11 is a schematic diagram of a positional relationship and shapes of two opposite driving magnets in an embodiment of the present disclosure.

For convenience, as shown in FIG. 11, it is assumed that the driving magnet integrally bent is divided into two sections, the magnet section at the long side of the screening can is an edge segment magnet and the magnet section adjoining a corner space position of the screening can is a corner segment magnet. The edge segment magnet and the corner segment magnet are the same in magnet thickness, and are connected to form an R angle. If the edge, opposite to the driving coil, of the edge segment magnet is an edge segment coil, the edge, opposite to the driving coil, of the corner segment magnet is a corner segment coil, and the edge segment coil and the corner segment coil are also connected at the R angle. An inside of each of the magnets is an N pole, and an outside of each of the magnets is an S pole.

According to the present disclosure, after a certain current is charged to the driving coil, the edge segment magnet located at the inner side and the corner segment magnet configured to adjoin the corner both take driving effect. Obviously, compared with an occasion without the edge segment magnet or the corner segment magnet, the effective action length (area) that the driving coil and the driving magnets are opposite in the present disclosure is larger, so the whole magnetic fluxes orthogonal to the driving coil is relatively large. Just because of this, under a certain current, the stronger driving force can be obtained. Furthermore, the corner segment magnet is provided at an opposite space position adjoining the corner, so there is no need for a special space. As the driving force is improved, the lens drive device can be further enabled to be miniaturized possibly.

Herein, the edge segment magnet and the corner segment magnet are only for description conveniently, are divided into two portions, and as a matter of fact, are portions on two different sections of the integral edge-bending magnet. The integral processing has more advantages than processing of independently separating into two portions. Because of the integration, the number of points on the components is reduced, and the assembly is more convenient and labor-saving.

Specifically and preferably, shapes of bent edge of the driving magnets keep consistent with those of bent edge of adjacent two edge of the driving coil. The driving magnets after being assembled are opposite to the driving coil. In the lens drive device, the driving magnets and the driving coil opposite to the driving magnets are parallel to each other, and distances in the two parallel sections are consistent. In the lens drive device, the two driving magnets located in the screening can are same in shape, size and thickness and are arranged oppositely at 180°.

The present disclosure is not limited to the above implementation forms, and may have various alternations made without departing from a theme scope of the present disclosure. For a person skilled in the art, pluralities of simple deviations or replacements made within the theme scope of the present disclosure should be considered as a scope of protection of the present disclosure.

For example, the lens support and the driving coil are unnecessarily made into the octagonal shape. The driving magnets may be unnecessarily integrated and also may be made into a split shape according to a design structure of the lens drive device. According to different shapes of the screening can and the driving coil, the driving magnets may be bent into a right-angled shape, a circular arc shape or a fold line shape.

The above describe the specific embodiments of the present disclosure in detail, are only exemplary embodiments and do not limit the specific embodiments described above. For a person skilled in the art, any equivalent modification and replacement made to the present disclosure are fallen into a scope of the present disclosure. Therefore, the equivalent alternation and modification made without departing from the spirits and scope of the present disclosure should be included in the scope of the present disclosure.

What is claimed is:

1. A lens drive device, wherein the lens drive device comprises a screening can, a periphery of the inside of the screening can being provided with an upper cover and driving magnets, a lens support being further provided inside the screening can, and a driving coil being winded at a outer periphery of the lens support, the lens support is formed by cutting four corners of a quadrilateral shape, and comprises four straight edges and four corner edges; the driving coil is winded at the outer periphery of the lens support in an octagon-like shape; wherein the driving magnets comprise a first driving magnet and a second driving magnet; a structure of each of the first driving magnet and the second driving magnet comprises a corner segment and an edge segment, the corner segment is arranged correspondingly with a corner of the screening can, the edge segment is arranged correspondingly with an edge of the screening can; the first driving magnet is corresponding to adjacent one corner edge and one straight edge of the lens support, and the second driving magnet is corresponding to adjacent another corner edge and another straight edge of the lens support, and the first driving magnet and the second driving magnet are in a central symmetry around an axial center of the lens drive device and distributed in a central symmetry in a positional relationship of being parallel to the driving coil and distributed oppositely at 180°, wherein the lens drive device further comprises a Hall detection component, the Hall detection component comprises a Hall magnet provided on the lens support, and a Printed Circuit Board (PCB) component; the PCB component comprises a PCB board provided at one side of the screening can as well as a Hall chip provided on the PCB board; the one side of the screening can is not the edge of the screening can having the edge segment of the driving magnets; and the Hall chip and the Hall magnet are arranged oppositely and are located on parts far away from the first driving magnet and the second driving magnet, wherein the Hall chip and the Hall magnet are located between a tail end of a corner segment of the first driving magnet and a tail end of a edge segment of the second driving magnet, or between a tail end of a edge segment of the first driving magnet and a tail end of a corner segment of the second driving magnet, and the Hall chip and the Hall magnet are arranged correspondingly with one straight edge of the lens support.

2. The lens drive device as claimed in claim 1, wherein a capacitor, pins and an internal connection circuit provided on the PCB board.

3. The lens drive device as claimed in claim 1, wherein the Hall chip and the Hall magnet are located at central positions whose distances to the tail end of the corner segment of the first driving magnet and the tail end of the edge segment of the second driving magnet are equal, or at central positions whose distances to the tail end of the edge segment of the first driving magnet and the tail end of the corner segment of the second driving magnet are equal.

4. The lens drive device as claimed in claim 1, wherein an upper gasket is further provided inside the screening can; an upper spring is arranged above the lens support and a lower spring is arranged below the lens support; and a pedestal that takes supporting effect is further provided at a bottom of the lower spring.

5. The lens drive device as claimed in claim 1, wherein the first driving magnet and the second driving magnet are the same in shape and size; a thickness of the corner segment and a thickness of the edge segment of each of the driving magnets are equal.

6. The lens drive device as claimed in claim 1, wherein a hole is formed on one side, corresponding to the PCB board, of the upper cover; the hole is configured to embed the Hall chip of a lug boss on the PCB board; and the Hall chip is opposite to the Hall magnet provided on the lens support.

7. The lens drive device as claimed in claim 1, wherein the screening can is made of a non-magnetic soft stainless steel material, and during an external connection process, has effects of preventing a static electricity and electromagnetically shielding by grounding.

8. The lens drive device as claimed in claim 1, wherein gap portions are respectively provided at upper four corners of the outer periphery of the lens support; and each of the gap portions is matched with each of turnup edges inside the screening can in a non-contact manner.

9. The lens drive device as claimed in claim 1, wherein the Hall detection component further comprises a Hall gasket, an opened notch portion is provided at an upper corner of the lens support; and the opened notch portion is accommodated into the Hall gasket and the Hall magnet sequentially and vertically from inside to outside.

* * * * *